UNITED STATES PATENT OFFICE.

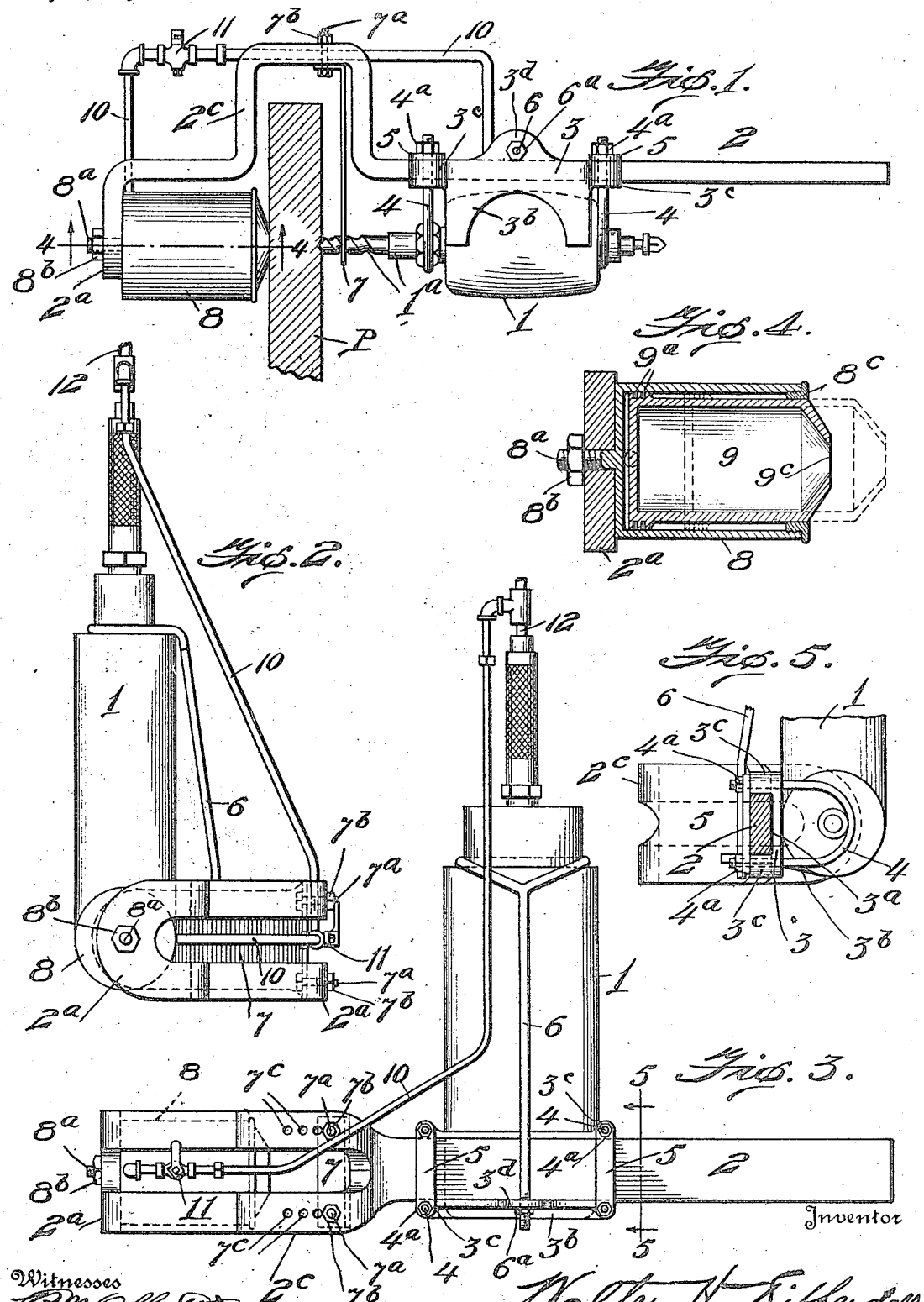

WALTER H. DIFFENDALL, OF HAGERSTOWN, MARYLAND.

PORTABLE DRILLING APPARATUS.

1,249,045.                Specification of Letters Patent.       Patented Dec. 4, 1917.

Application filed December 11, 1916.   Serial No. 136,216.

*To all whom it may concern:*

Be it known that I, WALTER H. DIFFENDALL, a citizen of the United States, residing at Hagerstown, in the county of Washington and State of Maryland, have invented certain new and useful Improvements in Portable Drilling Apparatus; and I hereby declare that the following is a full, clear, and exact description thereof, reference being had to the accompanying drawings, which form part of this specification.

This invention is a novel portable drilling apparatus and combines a frame carrying a preferably pneumatic or fluid pressure drill adjustably mounted thereon, and a pneumatic or fluid operated work clamp or presser for holding the drill to its work.

The drilling apparatus is particularly designed for drilling, counter-sinking, or reaming holes and sockets in metal, and is especially adapted for operating on metal flanges and sheets; and saves handling material and time, as it can be readily adjusted to drill successive holes in an object without stopping the drill; and can be used in almost any position either of the object or the apparatus, and it does not prevent other work, such as chipping, beveling or other drilling, being performed on another part of the object at the same time.

I will explain the invention as embodied in the apparatus illustrated in the accompanying drawing, and summarize in the claims the essential features and novel combinations of parts for which protection is desired.

In said drawings:—

Figure 1 is a bottom plan view of the complete apparatus.

Fig. 2 is an end elevation.

Fig. 3 is a rear elevation thereof.

Fig. 4 is an enlarged sectional view on the line 4—4, Fig. 1.

Fig. 5 is a transverse section on the line 5—5, Fig. 3.

1 represents the casing of an electric or fluid operated drill, of any well known type, a pneumatic drill being preferred, adapted to operate a tool $1^a$ of any desired kind. The drill casing 1 is adjustably attached to a supporting frame or bar 2 of Fig. 1 by means of a clamp member 3, which is provided on its rear side with a longitudinal channel $3^a$ adapted to fit the bar 2, so that the clamp member can be adjusted longitudinally of said bar. Said clamp member is provided on its front side with a projecting bracket portion $3^b$ adapted to support the lower end of the drill-casing, which may be rigidly fastened to the member 3 by means of U-bolts 4 which embrace the lower portion of the drill casing and extend through perforated ears $3^c$ on the upper and lower sides of the clamp member 3 above and below the frame 2, and are engaged by nuts $4^a$. The drill casing may be steadied in position on the clamp member 3 by means of a rod 6 having its upper end engaged with the upper part of the drill casing and its lower end engaged with an ear $3^d$ on the clamp member 3, and secured thereto by means of nuts $6^a$. Binding straps 5 are strung on bolts 4, at the rear side of the frame 2, so that when nuts $4^a$ are tightened said straps 5 securely fasten the clamp member and drill casing to the frame 2. By loosening nuts $4^a$ the member 3 and drill casing can be adjusted longitudinally of the frame.

As stated the drill may be of any suitable construction and may be electric or fluid operated; a pneumatic drill of known type being shown, and the drilling tool $1^a$ extends parallel with the frame 2 and operates practically at right angles to the main body of the drill casing.

To the other extremity of the frame 2 and disposed in the same axial plane as the drilling tool is a pneumatic work clamp or presser device; comprising an outer cylinder 8 which is closed at its rear end and may be provided with a threaded stud $8^a$ extending through an aperture in the end $2^a$ of the frame 2 (which end stands at right angles to the main portion of the frame) and is secured by a nut $8^b$. Within cylinder 8 is a piston 9, of Fig. 4, which when in retracted position practically fills the cylinder. Said piston is provided with a packing $9^a$ adjacent its inner end, and is guided in a packing and stop ring $8^c$, screwed into the outer end of the cylinder 8. Said piston is adapted to be projected outside the cylinder to engage the work and force same against the drilling tool. The piston is preferably hollow and has an opening $9^c$ in its outer end opposite the tool or drill $1^a$.

Air or fluid may be admitted into the rear end of the cylinder 8, to project the piston 9, by means of a pipe 10 which may communicate with the pipe 12 which supplies air or fluid to the drill operating mechanism in the usual manner. Said pipe 10 is provided with a 3 way cock 11 that can be opened and closed manually to admit air and cause the piston to clamp the work, and said valve vents the cylinder when closed so that the piston can be retracted.

The frame 2 has a lateral bend or U-shaped portion $2^c$, intermediate the drill and the cylinder to allow the edge of a plate or object being operated upon to be inserted to the desired depth between the tool and the piston; or the apparatus to be readily adjusted to the desired position for drilling a flange or plate.

A clearance or limiting bar 7 is fastened to the frame 2 and projects between the tool and the piston so as to limit the extent or depth of the cut made by the tool when it it not desired to drill entirely through the object. The limiting bar 7 may be adjustably attached to bar 2 by any suitable means; as by bolts $7^a$ adapted to engage any of a series of holes $7^c$ in the bar and secured by nuts $7^b$. The limiting bar 7 can be adjusted so that the depth of the hole bored by the tool can be regulated; or said bar may be detached and the apparatus used to bore holes, or for countersinking objects, etc., up to any width or thickness equal to the distance between the point of the tool and the piston when the drill is adjusted to the extreme outer end of the frame 2.

*Operation.*

When used for drilling holes in metal plates, for example, the apparatus may be adjusted over the edge of the plate indicated at P in Fig. 1, until the tool $1^a$ is opposite the point where it is desired to drill the plate; air is then admitted into the cylinder 8 and piston 9 is projected bringing the plate under yielding pressure against the tool $1^a$ and causing it to follow up as the tool bores until a hole of the desired depth is formed, or the plate is entirely perforated; the opening $9^c$ in the piston permits the tool to entirely perforate the plate without injury to the piston. The piston will hold the work up against the tool with the desired uniform pressure at all times, so that the tool will operate most efficiently.

The apparatus is readily portable; can be used for drilling various objects; and can be conveniently used in almost any position where an ordinary drill might be used; also that other kinds of tools might be used in lieu of the drill.

What I claim is:

1. In an apparatus of the character specified the combination of a frame, a tool operating member mounted thereon, and a pneumatic work clamp mounted on the frame opposite said member; with a limiting stop attached to said frame intermediate the tool and the clamp to limit the depth of the cut made by the tool.

2. In combination a supporting frame having a laterally projecting return bend intermediate its ends, a power actuated tool-operating member attached to said frame at one side of said return bend, and adjustable longitudinally of the bar, and a fluid-actuated work clamp attached to said frame at the opposite side of the bend.

3. In a drilling apparatus the combination of a bar, a pneumatic drill adjustably mounted on said bar, and a pneumatic work clamp also mounted on said bar in constant axial alinement with the drilling tool, said drill and clamp being relatively adjustable on said bar.

4. In combination a frame having a lateral offset, a support attached to said frame at one side of said offset and adjustable to or from the offset, a tool-operating member mounted on said support, and work clamping means attached to said frame at the side of the said offset opposite the tool-operating member.

5. In a drilling apparatus, the combination of a supporting frame having a lateral bend intermediate its ends; a fluid-actuated tool-operating apparatus adjustably attached to said frame at one side of said bend and carrying a tool disposed parallel with and longitudinally of the frame; and a fluid actuated work clamp attached to said frame at the side of the bend opposite the tool operating apparatus, substantially as described.

6. A drilling apparatus comprising a supporting bar, a supporting member mounted upon and adjustable longitudinally of said bar, means for detachably attaching the member to the bar, a tool casing detachably attached to said member and having a tool operating in a plane parallel with the bar; and a fluid operated work clamp also attached to the bar and arranged to operate opposite to and in line with the tool.

7. In an apparatus of the character specified the combination of a frame, a tool operating member mounted thereon and adjustable longitudinally thereof, a fluid actuated work clamp mounted on the frame opposite said member, and a limiting stop attached to said frame intermediate the tool and the piston to limit the depth of the cut made by the tool.

8. In combination a frame having a lateral bend, a support adjustably attached to said bar at one side of said bend, a tool operating member mounted on said support, a work clamping device attached to said frame at the side of said offset opposite the tool operating member, and a limiting stop attached to said frame intermediate the tool and the clamping device to limit the depth of the cut made by the tool.

In testimony that I claim the foregoing as my own, I affix my signature in presence of two witnesses.

WALTER H. DIFFENDALL.

Witnesses:
G. I. CHARLTON,
W. T. FERINGER.